PLURAL TIMER TONE BURST SELECTIVE CALLING SYSTEM

Filed July 4, 1968

Inventors
GARY A. CANNALTE
JEFFREY R. KANOFSKY
BY
Mueller, Aichele & Rauner
ATTYS.

3,546,674
PLURAL TIMER TONE BURST SELECTIVE CALLING SYSTEM

Gary A. Cannalte, Hoffman Estates, and Jeffrey R. Kanofsky, Chicago, Ill., assignors to Motorola, Inc., Franklin Park, Ill., a corporation of Illinois Filed July 5, 1968, Ser. No. 742,731
Int. Cl. H04q *1/18*
U.S. Cl. 340—171 7 Claims

ABSTRACT OF THE DISCLOSURE

Selective signalling system including frequency responsive circuit operable to select a particular frequency and used with feedback circuit to provide oscillations at such frequency. A control system includes first and second timers with the first timer having a first period and starting the second timer to provide a second period after the first period. For encoder operation, bursts of tone are provided when the first timer is released separated by longer time periods when first timer is operated. The frequency of the bursts and the time therebetween provides the code. During decoder operation the frequency responsive circuit applies tone bursts to the first timer which actuates the second timer, and a gate is operated by the second timer and by the first timer in response to the second burst applied thereto.

BACKGROUND OF THE INVENTION

It is desired in many communication systems wherein a plurality of stations operate on the same channel to provide a signalling system so that an individual station can be signalled. It may be desired to automatically render the equipment at one station operative without indicating at the other stations that communication is in progress. Various codes including signal components of different frequencies or different numbers of pulses arranged in groups have been used. In order to provide a code with a large number of calls the equipment required is relatively complex and therefore involves considerable expense.

In voice communication systems, in order to signal a particular station or render the equipment thereat operative, tones of different frequencies have been used for signalling. These tones may be in a frequency range at the lower end of the audio range so they can be transmitted continuously to render the selected equipment operative and not interfere with voice communication on the channel. To provide different frequencies for each station limits the number of stations which can be separately called, particularly when the frequencies are limited to those in the audio range which will not interfere with the voice communication.

SUMMARY OF THE INVENTION

It is an object of the present invention to provide a selective signalling system wherein a tone of a single frequency is transmitted as bursts with a predetermined spacing therebetween, with the frequency and the spacing of the bursts forming the code.

Another object of the invention is to provide a simple system for producing a signalling code formed by spaced bursts of tone and for responding to such bursts of tones.

A further object of the invention is to provide a selective signalling system which includes a frequency responsive circuit which responds to tones of a particular frequency with a timer set by a first burst of tone and responding to the second burst and used in cooperation with a second timer actuated by the first timer which operates for a time period extending to the second burst.

A still further object of the invention is to provide a system as outlined in the preceding paragraph when the equipment for decoder operation also provides encoder operation with feedback being applied to the frequency responsive circuit so that it operates as an oscillator, and with the periods of the timers being changed so that the first timer provides a period corresponding to the interval between tone bursts and the second timer operates after this period to trigger the first timer for repeated operation, the tone bursts being provided during the time the first timer is inoperative.

In practicing the invention a system is provided having a frequency responsive or selective circuit tuned to the frequency of a tone which is applied in bursts. For each code a single frequency is used with the bursts at a predetermined interval. The selected bursts trigger a first timer which in turn triggers a second timer. The first timer has a period somewhat less than the interval between bursts and the second timer continues after the first timer releases for a period which overlaps the next tone burst of the sequence. The first timer is triggered again by the next burst so that the first and second timers operate simultaneously to actuate a gate which controls the squelch of a receiver or some other means to indicate the receipt of the proper code.

For encoder operation, a feedback circuit is connected to the frequency responsive circuit to render the same operative as an oscillator. The time periods of the first and second timers are changed so that the first timer is operative for a period corresponding to the interval between bursts and the second timer continues after the first timer is released for a period corresponding to the duration of the bursts. The second timer actuates the first timer so that the first and second timers continue to operate in sequence. The first timer operates a tone gate to transmit the oscillations when the first timer is released, with the period of the first timer providing the interval between bursts.

BRIEF DESCRIPTION OF THE DRAWINGS

Referring now to FIG. 1 of the drawing, audio signals from a receiver, which may be a radio receiver or a receiver in a wire system, are applied to limiter 10 which applies constant amplitude signals to tone detector 11. The tone detector 11 includes a frequency responsive circuit, which may be a filter including one or more coils and capacitors, which passes a particular tone frequency. If the audio signal includes the tone frequency to which the tone detector 11 is responsive, the tone will be passed to the gate 12. Tone signals applied through the inhibit gate 12 actuate timer 14 which operates for a first time period. The timer 14 actuates timer 15 after a delay period. The timer 14 will release after the first timed period and the timer 15 will continue for a second timed period after the timer 14 has released.

Referring now to FIG. 2, line A shows the tone burst code utilized in the system of the invention. This includes bursts of tones A1 which are of the same frequency separated by time intervals A2 which have the same duration. The tone burst code as shown in line A is applied to the system of FIG. 1, and when this system is adapted to respond to this code, detector 11 will apply the tone burst through the inhibit gate 12 to the timer 14 to actuate the same. The operation of the timer 14 is shown in line B of FIG. 2. The timer 14 will be actuated by the first burst A1 at time B1 and will continue to be operated for a time period B2. During this time period, the timer 14 applies a voltage to close inhibit gate 12 so that any further tone bursts passed by detector 11 will not be applied to timer 14. The timed periods B2 of the timer 14 are somewhat less than the interval between bursts as shown at A2.

Figure 2:
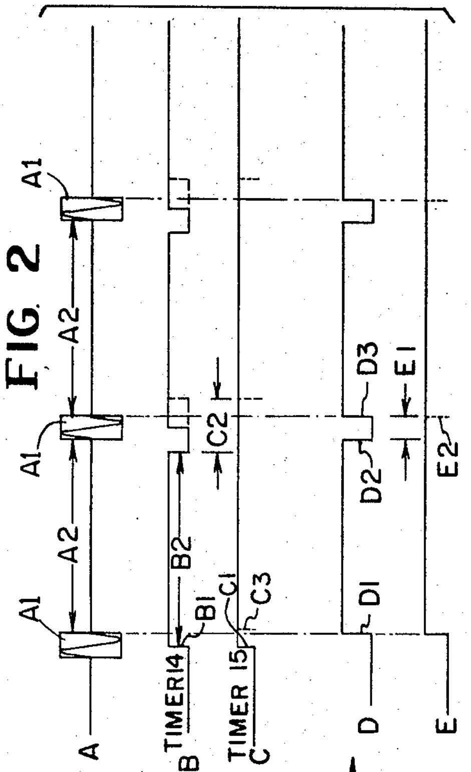
FIG. 2 is a timing diagram illustrating the operation of the system of FIG. 1.

The operation of the timer 15 is shown by line C in FIG. 2. The timer 15 is actuated at time C1 which is the same time (B1) that the timer 14 is actuated. The timer 15 will remain actuated as long as timer 14 is operative and then will continue for a timed period C2 after the timer 14 releases.

Figure 1:
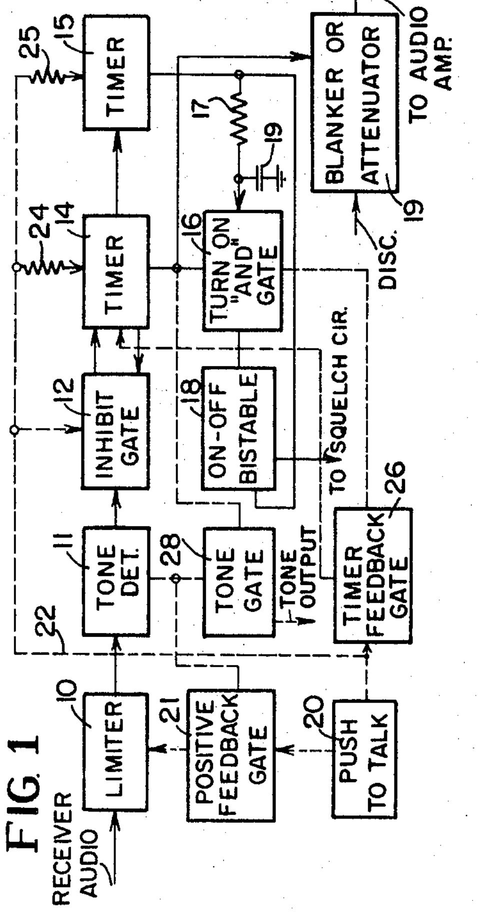
FIG. 1 is a block diagram of the system of the invention.

In the system of FIG. 1, the turn on AND gate 16 is responsive to inputs from the timers 14 and 15. When the first burst is applied to timer 14, this timer applies a pulse to AND gate 16 and a pulse to timer 15 to actuate this timer. Timer 15 applies a pulse through the R-C circuit including resistor 17 and capacitor 19 to gate 16. The R-C circuit delays the pulse from timer 15 so that it reaches gate 16 at time C3 and will not be present when the timer 14 is turned on by the first burst. Therefore the AND gate 16 will not be operated by the first tone burst. However, when the second tone burst is received, the timer 15 will still be on as indicated by the timed period C2. The second burst will be after the inhibit period B2 of gate 12 and will actuate the timer 14. The turn on of timer 14 will apply a pulse to AND gate 16, and as there is an input from timer 15, the AND gate 16 is actuated to apply a pulse to bistable circuit 18. This turns the bistable circuit 18 on to produce a voltage which can be used to open the squelch circuit of the receiver, or to actuate the alarm, as may be desired.

It will be apparent that the receipt of tone bursts at the time interval illustrated will cause the timer 15 to remain on as long as bursts are being received. During decoder operation, the timer 14 is not responsive to the timer 15 and it will time out between successive bursts, and then be turned on by the next tone burst. In the event that one tone burst does not appear at the proper time, timer 15 will release. This will remove the input from timer 15 to the turn on AND gate 16, so that this gate will be blocked. When the timer 15 releases, it will apply a pulse to the bistable 18 to reset the same. This will turn off the bistable 18 so there will be no squelch voltage applied to the audio of the receiver.

The system shown in FIG. 1 also operates as an encoder to provide the tone burst code. The system can be used in a two-way communication system wherein a push-to-talk switch is operated when it is desired to transmit. The push-to-talk switch is indicated at 20 and operates to actuate a positive feedback gate 21 which provides feedback from the tone detector 11 to the limiter 10. This forms an oscillator so that oscillations are produced at a frequency depending upon the tuning of the selective circuit of the detector 11. The push-to-talk switch 20 also activates a circuit 22 which is connected to the inhibit gate 12 and to the timers 14 and 15. The connection to the inhibit gate disables the same and causes the gate to apply a pulse to the timer 14 to actuate the same. The circuit 22 from the push-to-talk switch connects a resistor 24 in the circuit of timer 14 to change the time period, and a resistor 25 in the circuit of timer 15 to change its time period.

In FIG. 2 the operation of timer 14 for encoder operation is shown by line D. As stated, the timer is actuated at time D, by a pulse from inhibit gate 12 and produces a timed period D1–D2 controlled by resistor 24, which corresponds to the interval A2 between tone bursts in the code. The timer 14 actuates timer 15, as in decoder operation, and timer 15 will continue to operate for a time which includes a period E1 after the timer 14 has released at time D2. The timer 15 is connected through resistor 17, gate 16 and feedback gate 26 to the timer 14 so that when the timer 15 releases at time E2, it will cause the timer 14 to be actuated again at time D3. Timer 14 causes timer 15 to operate again, and the timers 14 and 15 will therefore repeat through the time periods, with timer 15 continuing for a period after timer 14 releases, and then releasing and at that time re-actuating timer 14.

The timer 14 operates a tone gate 28 which applies the tone from the oscillator including limiter 10, detector 11 and feedback gate 21 to the audio input of a transmitter or to another input. The gate 28 operates to provide the tone at the time the timer A is released.

During encoder operation, the period of timer 14 is the interval between bursts and in a specific example this may be 110 milliseconds. The period that the timer 15 continues to operate after the timer 14 releases is the duration of the tone burst and this may be 10 milliseconds. This is the period during which the timer 14 is released and the burst is transmitted, as set forth above. As the tone bursts are transmitted with a signal, such as voice, it is desired that the duration of the bursts be short so that interference with the signal will be minimized.

For decoder operation, with the code formed by bursts having 10 milliseconds duration and spacings of 110 milliseconds between bursts, the period of timer 14 must be slightly less than the interval between bursts and may be 100 milliseconds. Timer 14 will therefore be set by one burst and released before the next burst comes along. The period of timer 15 is such that it will continue operative after timer 14 has released until the second burst is received, and this period may be 20 milliseconds. Accordingly, for bursts repeating at an interval of 110 milliseconds, the timer 15 will remain operative at the time the second burst arrives at timer 14. The two timers 14 and 15 operate to turn on AND gates 16 so that it passes the pulse on to the bistable 18 to provide a control operation.

In order to prevent reproduction of the bursts of tone by the receiver being controlled, a blanker or attenuator 19 may be connected in the audio line and controlled by the timer 14 to cut out or reduce the tone bursts. The blanker would be triggered by the timer 14 and would operate for a duration equal to the duration of timer 15, which is 20 milliseconds in the example stated. This would not remove enough of the audio signal to interfere with proper reproduction.

Figure 3:
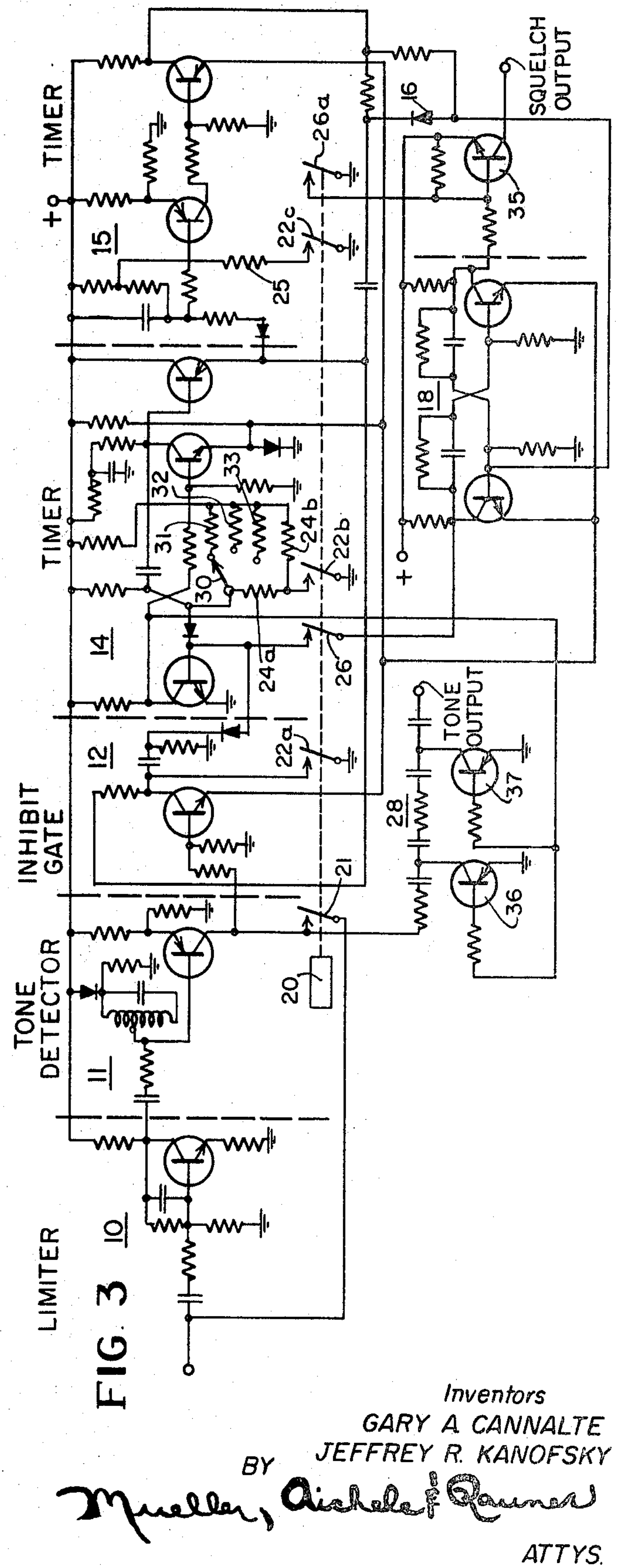
FIG. 3 is a circuit diagram of the system of the invention.

FIG. 3 shows in circuit diagram a combined encoder-decoder as illustrated by the block diagram of FIG. 1. The various circuit portions are numbered to correspond to the blocks in FIG. 1.

In the circuit of FIG. 3 the timer 14 includes a switch 30 and resistors 31, 32 and 33 to select different time intervals between the tone bursts. This will select the times A2 as shown in FIG. 2, line A, to provide different codes. The elements of the tuned circuit of the tone detector 11 can have different values to provide bursts of different frequencies.

For encoder operation, push-to-talk switch 20 is operated and closes the switches 21, *22a*, *22b*, *22c*, 26 and *26a*. Switch 21 is the positive feedback gate of FIG. 1 and provides feedback from the output of the tone detector 11 to the input of limiter 10.

Switch contacts *22a*, *22b* and *22c* provide the operations indicated by the line 22 in FIG. 1, which extends from the push-to-talk switch 20 to the inhibit gate 12, timer 14 and timer 15. Switch contact *22a* grounds the collector of the transistor of the inhibit gate 12 so that no signals are passed by the inhibit gate to the timer 14 during encoding. Switch contact *22b* connects the common point between resistors *24a* and *24b* of the timer 14 to ground to change the time period of timer 14, as has been described in connection with FIGS. 1 and 2. Switch contact *22c* connects resistor 25 to the discharge circuit of timer 15 to reduce the time period produced by this timer.

The connection from timer 15 to timer 14 to cause sequential operation of the timers, which is illustrated in FIG. 1 as being established through the turn on AND gate 16 and the timer feedback means 26 is provided in a somewhat different manner in the circuit of FIG. 3. In this circuit the connection extends through the AND gate 16 and the on-off bistable 18 and through the switch contact 26, which forms the timer feedback means, to the timer 14. This provides the same operation as described in FIG. 1. In order that the bistable 18 does not operate the squelch circuit of the receiver, an additional contact 26*a* is provided which grounds the base of the transistor 35 connecting the bistable 18 to the squelch circuit.

The tone gate 28 which provides the bursts of tone from the encoder oscillator to the transmitter includes transistors 36 and 37 which are in shunt with the tone output. The base electrodes of transistors 36 and 37 are connected to the timer 14 so that the timer renders these transistors conducting to ground the tone output where the timer 14 is on. The transistors 36 and 37 are cut off and allow the tone to pass when the timer 14 is off to provide the tone bursts. This is the same operation which has been described in connection with FIGS. 1 and 2.

An important feature of the invention is the ability to actuate a plurality of decoders by the same signal for group calling. This can be accomplished by applying a continuous tone to the system which will operate all decoders responsive to that frequency. This is because the continuous tone will fit into the time slots of all the decoders. As previously stated, different tones can be used to provide more codes and each tone can form a call for all the decoders responsive to the frequency of that tone.

The system of the invention can be used in systems with other types of codes using the same frequencies to provide a greater number of different codes. The system can be constructed by use of semiconductors or integrated circuits to provide an inexpensive overall construction.

What is claimed is:

1. In a selective signalling system for operation with bursts of tone repeating at a given time interval, and wherein tones of different frequencies and bursts at different time intervals are used to form different codes, a combined encoder and decoder system including in combination, frequency responsive means tuned to a particular tone frequency, feedback means coupled to said frequency responsive means and rendered operative to produce oscillations at said particular tone frequency, first timer means operative for a first timed period when actuated, second timer means actuated by said first timer means, and control means coupled to said timer means and to said frequency selective means, said control means including means connecting said frequency selective means to said first timer means to apply a received tone burst thereto to initiate a first timed period having a duration less than the interval between tone bursts, said second timer means being operative for a second timed period extending beyond the interval between tone bursts, said control means including control gate means coupled to said first and second timer means and responsive thereto, to provide control action, said control means being actuated for encoder action to render said feedback means operative to cause oscillations and to adjust the time periods of said first and second timer means so that said first timer means is operative for a timed period corresponding to the interval between tone bursts and said second timer means continues for a period corresponding to the duration of a tone burst, said control means coupling said second timer means to said first timer means to cause said first timer means to operate as said second timer means releases so that said first and second timer means continues operation in sequence, and tone gate means coupled to said first timer means for transmitting said oscillations during released periods of said first timer means.

2. The system of claim 1 wherein said control means includes inhibit gate means connected between said frequency selecting means and said first timer means and operated by said first timer means to prevent the application of tone bursts thereto during said first timed period.

3. The system of claim 1 wherein said control gate means is enabled by said second timer means and acts to provide a control voltage in response to operation of said first timer means.

4. The system of claim 3 including time delay means coupling said second timer means to said control gate means for enabling said control gate means after a time delay.

5. In a selective signalling system for operation with bursts of tone repeating at a given time interval, and wherein tones of different frequencies and bursts at different time intervals are used to form different codes, a decoding system including in combination, frequency responsive means tuned to a particular tone frequency, first timer means operative for a first timed period when actuated, second timer means actuated by said first timer means and operative for a time duration including a second timed period after said first timer means releases, and control means coupled to said timer means and to said frequency selective means, said control means including means connecting said frequency selective means to said first timer means to apply a received tone burst thereto to initiate a first timed period having a duration less than the interval between tone bursts, said second timer means being operative for a second timed period extending beyond the interval between tone bursts, said control means including gate means coupled to said first and second timer means and responsive thereto to provide a control action.

6. The system of claim 5 wherein said control means includes inhibit gate means connected between said frequency selective means and said first timer means and operated by said first timer means to prevent the application of tone bursts thereto during said first timed period.

7. The system of claim 5 including time delay means coupling said second timer means to said gate means for enabling the same at a time following initial operation of said first and second timer means, and wherein said gate means is actuated to provide a control voltage in response to a second operation of said first timer means.

References Cited

UNITED STATES PATENTS 3,465,294 9/1969 Carsello et al. ------- 340—171

HAROLD I. PITTS, Primary Examiner

U.S. Cl. X.R.

340—164, 167